United States Patent [19]
Yoshimoto et al.

[11] Patent Number: 5,481,517
[45] Date of Patent: Jan. 2, 1996

[54] TRACK JUMP CONTROL MEANS FOR A DISK APPARATUS

[75] Inventors: Kyosuke Yoshimoto; Yoshiki Nakajima; Kimiyuki Koyanagi; Osamu Ito, all of Amagasaki; Akira Mashimo, Tokorozawa; Hiroyuki Onda, Hoya; Yutaka Kobayashi, Musashino; Koji Yamana, Setagaya, all of Japan

[73] Assignees: Mitsubishi Electric Corporation; Teac Corporation, Japan

[21] Appl. No.: 93,440

[22] Filed: Jul. 16, 1993

Related U.S. Application Data

[63] Continuation of Ser. No. 788,554, Nov. 6, 1991, abandoned.

[30]   Foreign Application Priority Data

Nov. 9, 1990   [JP]   Japan ................................. 2-305784

[51] Int. Cl.$^6$ ...................................................... G11B 7/00
[52] U.S. Cl. ................................ 369/44.28; 369/44.34
[58] Field of Search ................................ 369/44.28, 54, 369/58, 32, 44.25, 44.27, 44.32, 44.34, 44.29, 48; 360/78.04, 78.09

[56]   References Cited

U.S. PATENT DOCUMENTS

| | | | |
|---|---|---|---|
| 4,057,832 | 11/1977 | Kappert | 369/44.28 |
| 4,899,325 | 2/1990 | Katsuhara et al. | 369/32 |
| 5,046,058 | 9/1991 | Shimonou | 369/44.28 |

*Primary Examiner*—Frank Gonzalez
*Assistant Examiner*—P. W. Huber
*Attorney, Agent, or Firm*—Andrus, Sceales, Starke & Sawall

[57]   ABSTRACT

The disk drive apparatus of the present invention has an optical pickup that jumps a track to perform track jumping when a jumping voltage is impressed, and that traces a track by performing brake operation when a braking voltage is applied, and actuator that drives the optical pickup, a signal processing part that performs focus and tracking control with respect to the optical pickup, a movement time measurement part that measures the movement time when a light beam emitted from the optical pickup is moved to cross a track to a required track, a voltage control part that uses the results of measurement to generate parameters and a voltage value that is applied to the actuator, a storage part that stores voltage value that is generated by the voltage value setting part, and that after a disk is loaded, first stores data of that disk in the storage part and uses those data values according to the track jump operation.

8 Claims, 4 Drawing Sheets

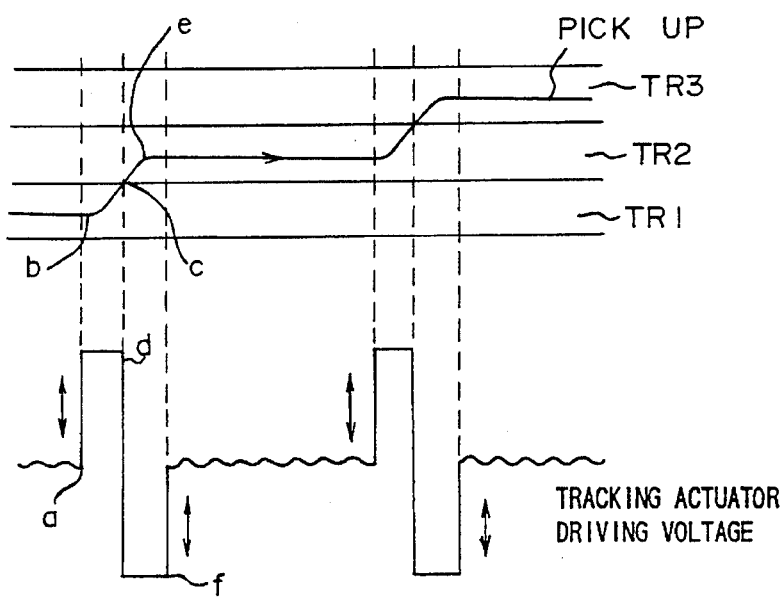
FIG. 1A PRIOR ART
FIG. 1B
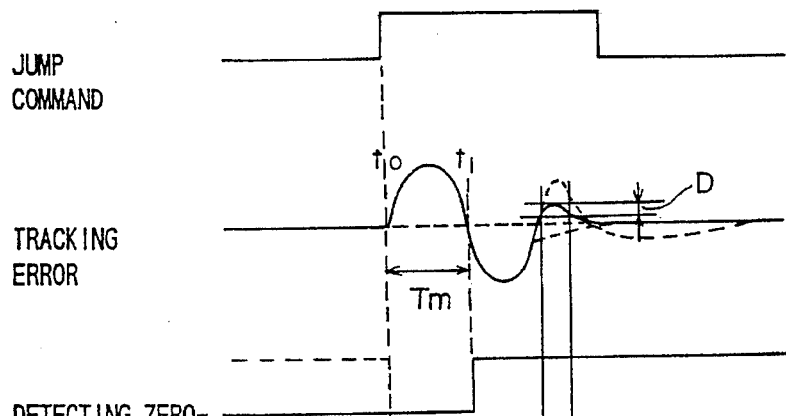
FIG. 4A  JUMP COMMAND
FIG. 4B  TRACKING ERROR
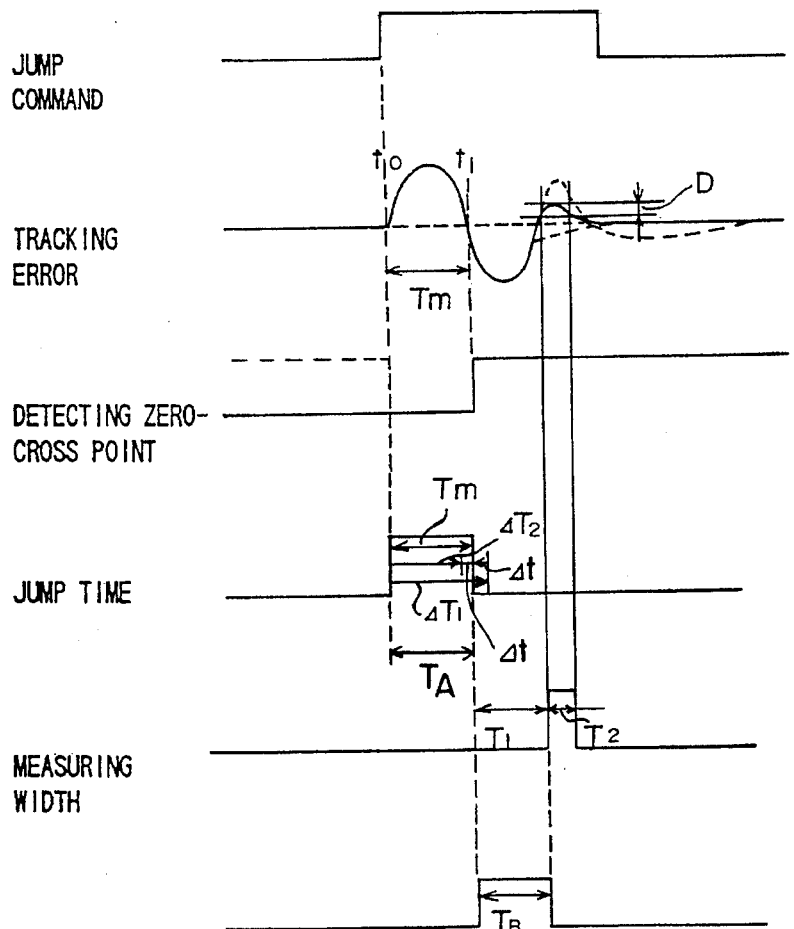
FIG. 4C  DETECTING ZERO-CROSS POINT
FIG. 4D  JUMP TIME
FIG. 4E  MEASURING WIDTH
FIG. 4F  BRAKING TIME

TRACK JUMP CONTROL MEANS FOR A DISK APPARATUS

The present application in a continuation of application of U.S. patent application, Ser. No. 07/788,544, filed Nov. 6, 1991, now abandoned.

BACKGROUND OF THE INVENTION

The present invention relates to a disk drive apparatus, and more particularly to a disk drive apparatus where an optical pickup jumps over a track or tracks of a disk and performs a search operation.

Information signals are recorded on tracks of disks in a disk drive apparatus in a pattern of concentric circles or a spiral shape. The information signals that were recorded on the disk are read by an optical pickup that traces those tracks. In the disk drive apparatus an actuator of the optical pickup is driven to control the optical pickup. The optical pickup emits a light beam to a required track on the disk and reads the information signal by tracing that track. When the optical pickup is to be moved to a required track, the light beam emitted from the optical pickup traverses or jumps over one or a plural number of tracks. This operation is called a track jump in this specification. When the light beam is required to jump over tracks, the actuator controls the angle of the light beam emitted from a light source in the optical pickup.

When the light beam performs the track jump from a track TR1 to a track TR2 as shown in FIG. 1A an operation in the conventional art will be described in conjunction with FIG. 1B. When the light beam which traces the track TR1 under a known tracking servo is to jump to the track TR2, a constant positive jumping voltage is applied to a tracking coil of the actuator at a time point 'a' as shown in FIG. 1B. The light beam thus starts to move laterally from a position 'b' on the track TR1 towards the track TR2 as shown in FIG. 1A. When the light beam reaches a position 'c' (FIG.1 A) on a border line of the contiguous tracks TR1 and TR2, at the time point 'd' in FIG. 1B, the voltage applied to the tracking coil of the actuator is switched to a constant negative braking voltage as shown in FIG. 1B. This negative braking voltage causes the actuator to perform a braking operation for the actuator, and therefore the light beam stops its lateral movement when the light beam reaches a position 'e' on the track TR2. The applying of braking voltage to the tracking coil is thus ceased at a time point 'f'.

The track jump of the light beam from the track TR1 to the track TR2 is performed by the above described operation, and thereafter the light beam traces the track TR2. As the light beam traces the track TR2, as is well known, a tracking servo voltage is applied to the tracking coil.

When the light beam jumps from the track TR2 to an adjacent track TR3, as shown in the right portion in FIGS. 1A and 1B, the same operation as described above is performed.

In this conventional disk drive apparatus a drive voltage having a constant positive and negative waveform as shown in FIG. 1B is applied to the actuator when the track jump is to be performed. Accordingly, when another disk is set in the disk drive apparatus to read information signals on the disk, the characteristics of the actuator are inevitably changed by alterations due to the time passage and the temperature change between the disk which was previously set and the other disk which is newly set. Changes in the characteristics of the actuator cause changes in the jumping time, and cause instability in the track jumping. In addition, depending upon the position of the disk, differences in the track jumping conditions may cause differences in the jumping time, depending upon a position on the disk. Therefore, the reproducing operations of signals from the disk also become unstable.

SUMMARY OF THE INVENTION

Accordingly, a general object of the present invention is to provide a disk drive apparatus that has a novel and effective track jump means for a disk drive apparatus that solves the above described problems associated with the conventional apparatus.

A specific object of the present invention is to provide a disk drive apparatus that performs a stable operation for each disk and without the influence of time passage and temperature changes when a different disk is set in the apparatus.

Another object of the present invention is to provide a disk drive apparatus that can set the time required for track jump of an optical pickup to a predetermined time width.

Still another object of the present invention is to provide a disk drive apparatus that enables entry in to the tracking servo operation by setting the drive signal waveform for track jump of the pickup for each disk.

These objects of the present invention are achieved by a disk drive apparatus comprising:

pickup means for tracing a track on a disk, said pickup means performing track jumping when a jumping voltage is applied thereto, and performing a braking operation when a braking voltage is applied thereto, rotation control means for rotating the disk, signal processing means for performing focus and tracking control with respect to the pickup means, movement time measurement means for measuring the movement time when the pickup means is moved from a track to another track, voltage value setting means for providing a voltage value to be applied to a driving means according to the results of measurement of the movement time measurement means, and storage means for storing a voltage value as information from the voltage value setting means, wherein the pickup means performs a track jump operation based on the voltage value read from the storage means.

Other objects and features of the present invention will become apparent from the detailed description of the present invention, with reference to the accompanying drawings.

BRIEF DESCRIPTION OF THE DRAWINGS

FIG. 1A is a diagram illustrating a track jump operation;

FIG. 1B is a waveform diagram of a tracking actuator drive voltage;

FIGS. 4A–4F are respectively time charts for explaining the track jump operation in the embodiment of the present invention.

DESCRIPTION OF THE PREFERRED EMBODIMENTS

Figure 2:
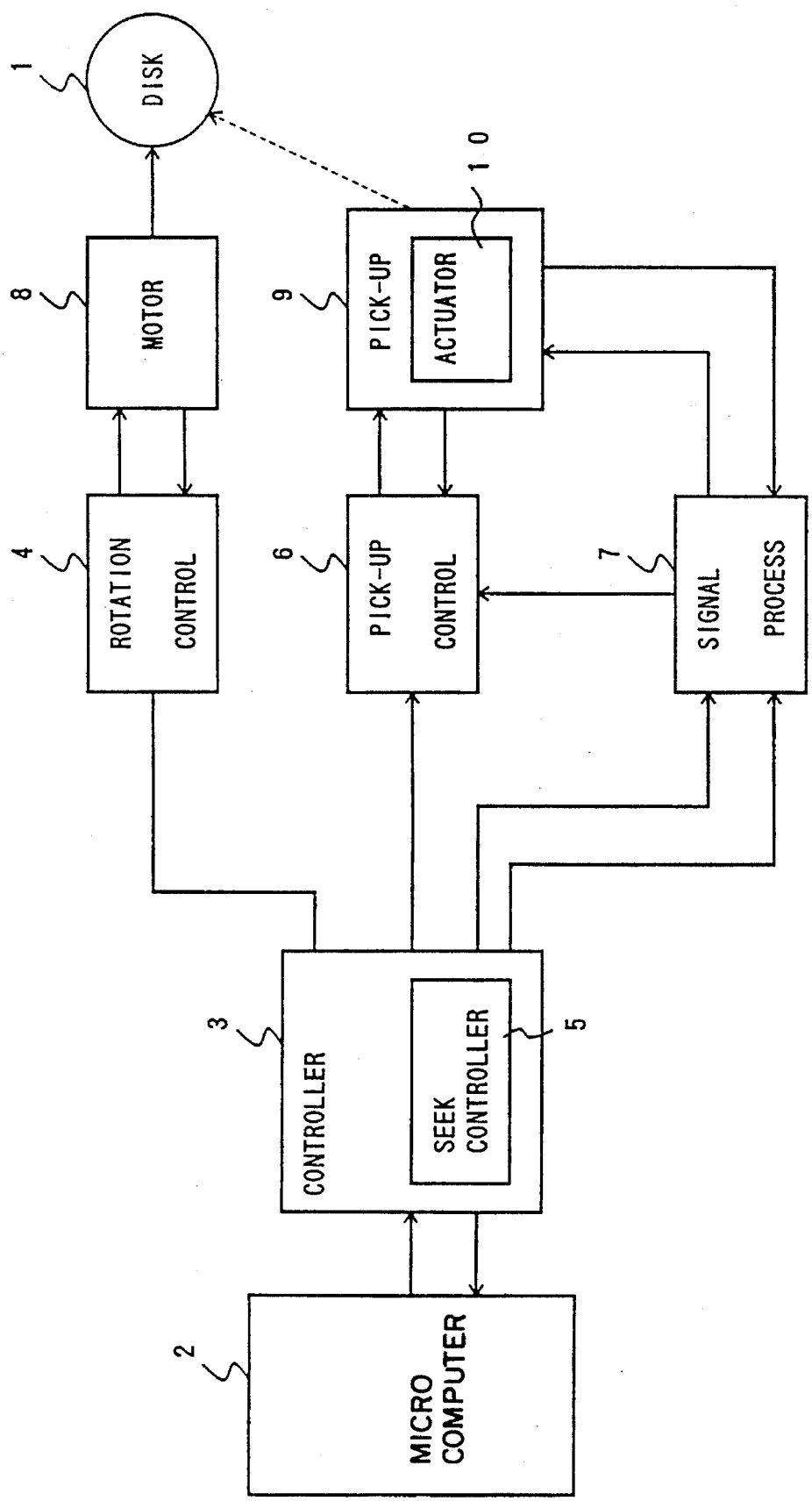
FIG. 2 is a block diagram showing an embodiment of the present invention.

In FIG. 2, a disk drive apparatus has a controller 3, a rotation control part 4, an optical pickup control part 6, a signal processing part 7, a motor 8, an optical pickup 9 and an actuator part 10. The controller 3 is connected to a micro-computer 2. An optical disk 1 is set at a predetermined mounting position in the disk drive apparatus by a loading mechanism (not shown in the figure). The controller 3 performs control operations responsive to commands from the micro-computer 2. Each of the control parts is connected to the controller 3. The rotation control part 4 is connected to the motor 8 for rotating the optical disk 1. The pickup control part 6 is connected the pickup 9. The signal processing part 7 is connected to the pickup control part 6 and the pickup 9.

In response to commands from the controller 3, the rotation control part 4 controls the rotation of the motor 8 and thus controls the rotation of the optical disk 1. The optical pickup control part 6 controls the optical pickup 9 by commands from the controller 3. In response to commands from the controller 3, the signal processing part 7 causes the optical pickup 9 and the optical pickup control part 6 to perform the tracking and focus control.

The optical pickup 9 has an actuator part 10. This actuator part 10 has a focussing actuator for focussing the light beam on the optical disk 1, and a tracking operation actuator for controlling tracking of the light beam on a track. The light beam that is emitted from the light source (not shown in the figure) is projected to a track on the optical disk 1 by the actuator part 10.

Figure 3:
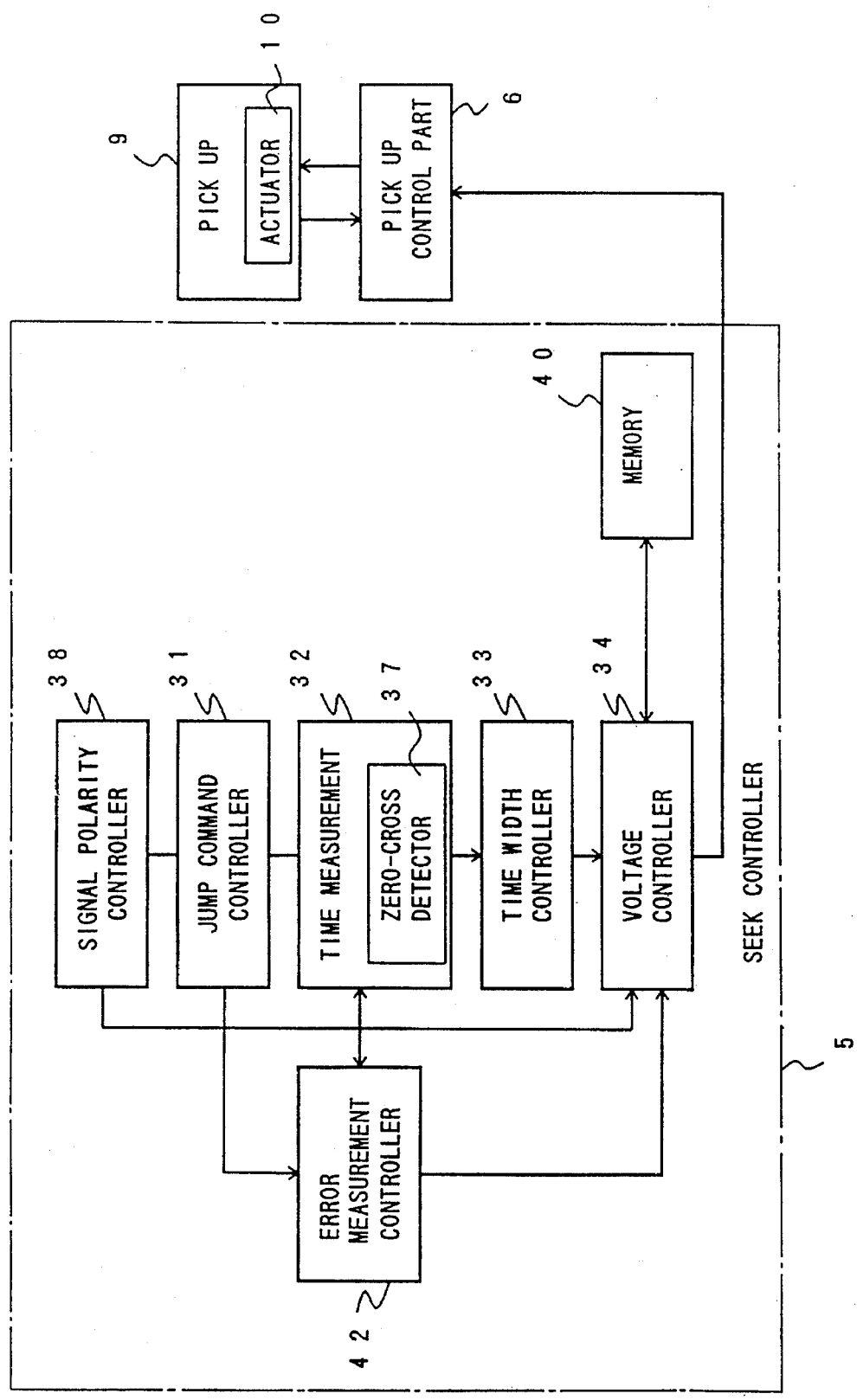
FIG. 3 is a block diagram showing a seek controller in the embodiment of the present invention.

The controller 3 has a seek controller 5 that controls the track jump of the optical pickup 9 on the optical disk 1. As shown in FIG.3, the seek controller 5 comprises a jump command controller 31, a time measurement part 32, a time width controller 33, a voltage controller 34, a zero-cross detector 37, a signal polarity controller 38, a memory 40, and error measurement part 42.

Figure 5:
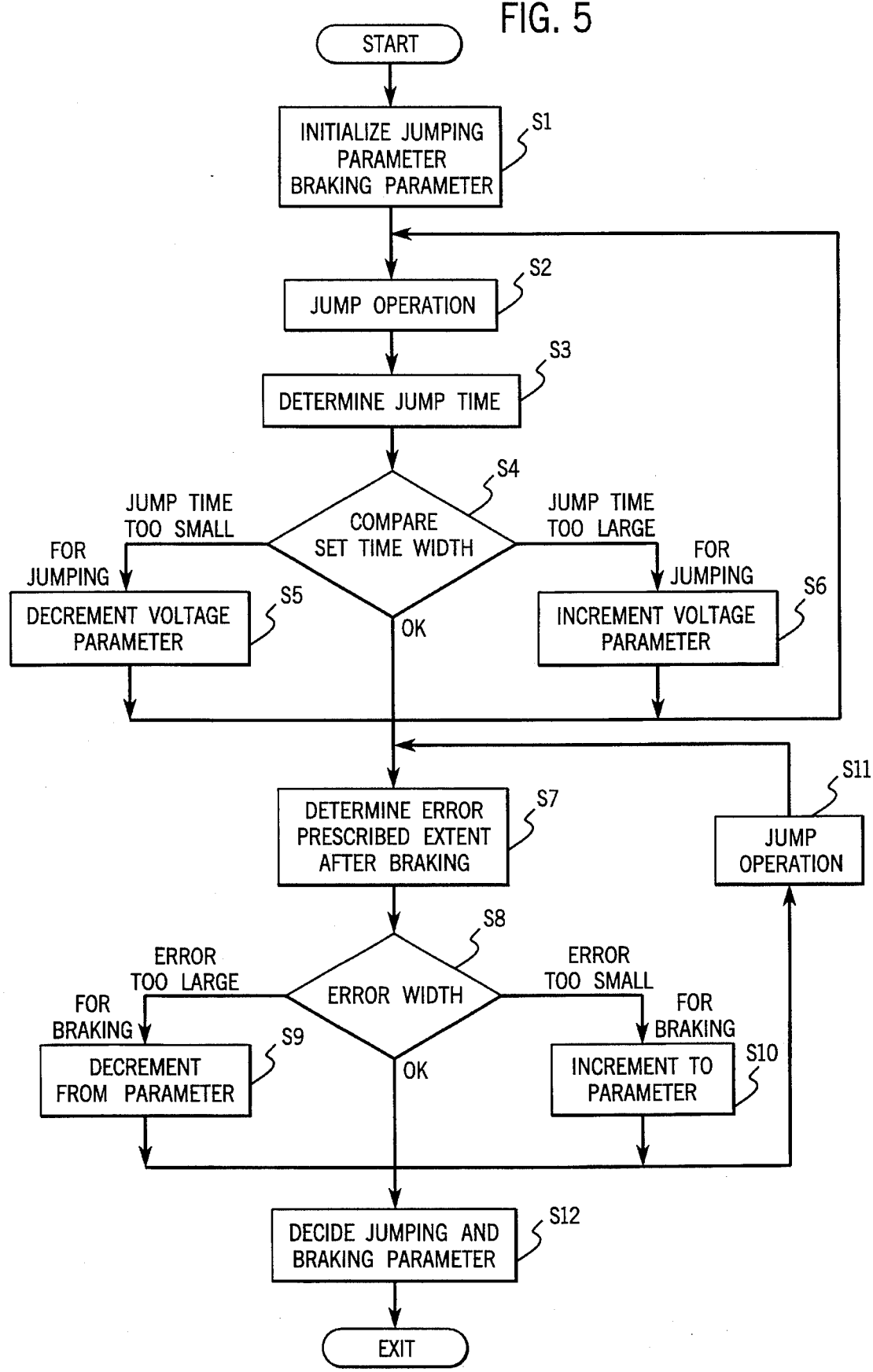
FIG. 5 is a flow chart of the track jump operation of an embodiment of the present invention.

The operation of the seek controller 5 of the controller 3 will be described below with reference to FIG. 3, FIG. 2 and the flowchart of FIG. 5.

The jump command controller 31 outputs a positive signal of the jump command to the pickup control part 6, the time measurement part 32 and the voltage controller 34. The voltage controller 34 the initial value of the jump-brake parameter in the memory 40 (Step 1 in FIG. 5).

The pickup control part 6 drives the actuator part 10 in response to the voltage from the voltage controller 34. The voltage controller 34 applies the jumping voltage to the actuator part 10 by way of the pickup control part 6. At this time, the polarity of the jumping voltage is determined by the signal polarity controller 38. When the pickup 9 is to perform a jump operation, the signal polarity controller 38 operates so that the voltage controller 34 applies a positive voltage to the pickup control part 6. On the other hand, when the pickup 9 is to perform the braking operation, the signal polarity controller 38 operates, so that the voltage controller 34 applies a negative voltage to the pickup control part 6 (Step 2 in FIG. 5).

The time measurement part 32 receives a jump command from the jump command controller 31, and measures an interval of a jump time (Tm) in FIG. 4B. The jump time (Tm) is a time interval between the time (t0) when the optical pickup 9 starts its jump and a time (t1) when a zero-cross is detected by the zero-cross detector 37 for detecting the zero-cross point of the tracking error signal. The zero-cross point is the time when the pickup 9 reaches a border of tracks on the disk (Step 3 in FIG. 5).

The time measurement part 32 supplies an information signal representing the jump time interval (Tm) to the time width controller 33. The time width controller 33 compares the jump time interval (Tm), determined by the time measurement part 32, against the summation of a predetermined time width $T_A$ and a time width tolerance $\Delta t$; that is $T_A \pm \Delta t$ (FIG. 4D). When the jump time interval (Tm) is larger than the sum of the predetermined time width $T_A$ and the time width tolerance $\Delta t$ (i.e. $T_A + \Delta t = \Delta T_1$), the voltage parameter is increased. When the jump time interval (Tm) is smaller than the difference of the predetermined time width $T_A$ and the time tolerance $\Delta t$ (i.e. $T_A - \Delta t = \Delta T_2$), the voltage parameter is decreased. Thus, the voltage controller 34 sets a positive jumping voltage value so that the jump time (Tm) is brought within the time width ($T_A \pm \Delta t$) that has been set by the time width controller 33. If Tm> $\Delta T1$, the voltage controller 34 operates so as to increase the voltage amplitude and if Tm<$\Delta T2$, the voltage controller 34 operates so as to decrease the voltage amplitude. Subsequently, the voltage controller 34 sets the negative voltage value for braking the movement of the light beam during track jump. The voltage controller 34 applies a negative voltage to the pickup control part 6 and performs a braking operation (Step 7–11 in FIG. 5).

Subsequently, the error controller 42 provides a required time width T2, as shown in FIG. 4E, after the measurement of the interval of a jump time falls within a required time width tolerance $\Delta t$, and the braking operation of the pickup 9 is performed.

The error controller 42 carries out the sampling of a tracking error signal at one or two points. The voltage controller 34 changes the braking negative voltage step by step so that the error amount level of the sampled tracking signal may be at a required level 'D' as shown in FIG. 4B. If the error amount level of a tracking error is larger than the required level 'D' in FIG. 4B, the voltage controller 34 increments the voltage parameter, which decreases the magnitude of the negative braking voltage applied to the actuator part 10 from the pickup control part 6. If the error amount level is smaller than the level 'D', the voltage controller 34 sets the parameter at +1. The negative voltage for braking is thus applied to the actuator part 10 from the pickup control part 6.(Step 7, Step 8, Step 9, Step 10).

The voltage controller 34 performs repeated tracking operations until the error amount level comes within the required level 'D' as shown solid line in FIG. 4B (Step 11).

The voltage controller 34 determines the voltage value of the brake pulse and the voltage value of the jump pulse which determines the parameters for jump operation and brake operation (Step 12).

In this manner, upon track-jumping, the drive signal waveform that is supplied to the tracking actuator for track jump is determined by measuring the status of movement of the optical pickup 9.

As mentioned above, the brake pulse voltage value parameter are, the jump pulse voltage value parameter are stored the memory 40. Thereafter, in the track jump operation is performed based on the data that is stored in the memory 40.

The following is a description of the case when the data stored in the memory 40 is used. The data stored in the memory 40 is read out. The disk drive apparatus uses the thus read out data to obtain the track jumping voltage value and the braking voltage value. The controller 3 of the disk drive apparatus controls the pickup control part 6 so that the voltage value for track jump is applied to the actuator part 10 of the optical pickup 9. The pickup control part 6 applies the braking voltage, obtained under control of the output of the voltage controller based on the data read from the memory 40, to the actuator part 10 of the optical pickup 9 to perform focus control and tracking control.

In addition, the positive voltage value for jump becomes constant with respect to the tracking actuator by setting a constant time required for track jump for individual disks. Accordingly, it is possible to easily enter into stable tracking servo operation and so it is possible to attain stable tracking.

Moreover, in the present embodiment, the present invention is applied to an optical disk tracking apparatus but the present invention is not limited to this since it can also be applied to other disk drive apparatus. Further, the present invention is not limited to the embodiments described heretofore, but various variations and modifications may be made without departing from the scope of the invention.

What is claimed is:

1. A disk drive apparatus comprising:

a pickup means for tracing a track on a disk, said pickup means performing a track jump in which said pickup moves from one track to an adjacent track, said track jump comprising a track jump operation during which a jumping voltage is applied to said pickup means and a braking operation during which a braking voltage is applied to said pickup means;

rotation control means for rotating the disk;

signal processing means for controlling the focus and tracking of said pickup means;

position detecting means for detecting a position of said pickup means when a braking operation has ended;

voltage value setting means for determining, on the basis of the measurement results of the position detecting means, a value of a braking voltage that, when applied for a fixed period of time, will halt movement of said pickup means at a desired tracking error amount level;

storage means for storing information comprising said voltage value from said voltage value setting means; and driving means for obtaining said voltage value from said storage means and supplying a voltage based on said voltage value to said pickup means;

wherein said pickup means performs a braking operation of a track jump according to said voltage value obtained from said detection results of said position detecting means.

2. A disk drive apparatus as claimed in claim 1 wherein the position detecting means is further defined as an error measuring means having a certain time width for measuring the tracking error amount level of a tracking error signal within said time width by sampling the tracking error signal; and the voltage value setting means comprises voltage control means for controlling the voltage value by lowering the voltage value when the error amount measured by said error measuring means is higher than a predetermined level, and by raising the voltage value when the tracking error amount level is lower than the predetermined level.

3. A disk drive apparatus as claimed in claim 2, wherein said error measuring means sets a constant time period, after the lapse of a time period for performing a braking operation, and measures an error amount level of a tracking error signal within said constant time period.

4. A disk drive apparatus comprising:

a pickup means for tracing a track on a disk, said pickup means performing a track jump in which said pickup moves from one track to an adjacent track, said track jump comprising a track jump operation during which a jumping voltage is applied to said pickup means and a braking operation during which a braking voltage is applied to said pickup means;

rotation control means for rotating the disk;

signal processing means for controlling the focus and tracking of said pickup means;

moving time measurement means, said moving time measurement means comprising means for establishing a fixed time period for carrying out a track jump operation, said moving time measurement means further comprising means for measuring the moving time between a time when said pickup means begins a track jump from a given track and a time when it has moved to a border of an adjacent track;

voltage value setting means for determining, on the basis of a comparison of the fixed time period and the moving time, a value of a jumping voltage that will move said pickup means from the given track to the adjacent track in a moving time corresponding to the fixed time period so that the moving time becomes similarly fixed;

storage means for storing information comprising said voltage value from said voltage value setting means; and driving means for obtaining said voltage value from said storage means and supplying a voltage based on said voltage value to said pickup means;

wherein said pickup means performs a track jump operation of a track jump according to the measurement and comparison results.

5. A disk drive apparatus as claimed in claim 4, wherein said voltage value setting means includes polarity switching means that switches polarities of voltage values for track jump operation and braking operation.

6. A disk drive apparatus as claimed in claim 4, wherein said voltage value setting means comprises:

comparing means for comparing a value measured by said moving time measurement means and a predetermined level, and voltage control means for increasing the voltage value when a value measured by said moving time measurement means is larger than the fixed time period, and for decreasing the voltage value when a value measured by said moving time measurement means is smaller than the fixed time period.

7. A disk drive apparatus as claimed in claim 4, wherein said moving time measurement means includes zero-cross detector means for detecting a zero-cross point of a wave form of a tracking error signal, and means for measuring the time interval between a time point when said pickup means starts to move and a time point of the zero-cross point.

8. A disk drive apparatus comprising:

a pickup means for tracing a track on a disk, said pickup means performing a track jump in which said pickup moves from one track to an adjacent track, said track jump comprising a track jump operation during which a jumping voltage is applied to said pickup means and a braking operation during which a braking voltage is applied to said pickup means;

rotation control means for rotating the disk;

signal processing means for controlling the focus and tracking of said pickup means;

moving time measurement means, said moving time measurement means comprising means for establishing a fixed time period for carrying out a track jump operation, said moving time measurement means further comprising means for measuring the moving time between a time when said pickup means begins a track jump from a given track and a time when it has moved to a border of an adjacent track;

position detecting means for detecting a position of said pickup means when a braking operation has ended;

jumping voltage value setting means for determining, on the basis of a comparison of the fixed time period and the moving time, a value of a jumping voltage that will move said pickup means from the given track to the adjacent track in a moving time corresponding to the fixed time period so that the moving time becomes similarly fixed;

braking voltage value setting means for determining, on the basis of the measurement results of the position detecting means, a value of a braking voltage that, when applied for a fixed period of time, will halt movement of said pickup means at a desired tracking error amount level;

storage means for storing information comprising voltage values from said jumping voltage value setting means and said braking voltage value setting means; and driving means for obtaining said voltage values from said storage means and supplying voltages based on said voltage values to said pickup means;

wherein said pickup means performs a track jump according to said jumping voltage value obtained from said measurement results of said moving time measurement means and according to said braking voltage value obtained from said measurement results of said position detecting means.

* * * * *